(12) United States Patent
Kobayashi et al.

(10) Patent No.: US 8,813,702 B2
(45) Date of Patent: Aug. 26, 2014

(54) VALVE TIMING CONTROL DEVICE

(71) Applicant: Aisin Seiki Kabushiki Kaisha, Kariya (JP)

(72) Inventors: Masaki Kobayashi, Okazaki (JP); Kazuo Ueda, Gamagori (JP); Hiromitsu Shigyo, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/874,730

(22) Filed: May 1, 2013

(65) Prior Publication Data

US 2014/0041606 A1    Feb. 13, 2014

(30) Foreign Application Priority Data

Aug. 8, 2012 (JP) .................................. 2012-176052

(51) Int. Cl.
*F01L 1/34* (2006.01)

(52) U.S. Cl.
USPC ...................... 123/90.17; 123/90.15; 464/160

(58) Field of Classification Search
USPC ...................... 123/90.15, 90.17; 464/1, 2, 160
See application file for complete search history.

(56) References Cited

U.S. PATENT DOCUMENTS

| 7,363,898 B2 | 4/2008 | Suzuki et al. |
| 8,146,550 B2* | 4/2012 | Takemura .................. 123/90.17 |
| 2012/0017857 A1 | 1/2012 | Kato et al. |
| 2012/0152190 A1 | 6/2012 | Kobayashi et al. |

FOREIGN PATENT DOCUMENTS

| JP | 2007-198365 A | 8/2007 |
| JP | 4415524 B2 | 2/2010 |
| WO | WO 2011/055589 A1 | 5/2011 |

* cited by examiner

*Primary Examiner* — Ching Chang
(74) *Attorney, Agent, or Firm* — Buchanan Ingersoll & Rooney PC

(57) ABSTRACT

Provided is a valve timing control device, including: a drive side rotating member, a driven side rotating member, fluid pressure chambers, partition portions, advanced angle control oil passages, retarded angle control oil passages, an intermediate lock mechanism, and a retarded angle lock mechanism, in which the intermediate lock mechanism is configured to include a single intermediate lock member, a biasing mechanism which biases the intermediate lock member, and an intermediate fitting depression portion, and the retarded angle lock mechanism is configured to include a single retarded angle lock member, a biasing mechanism which biases the retarded angle lock member, and a retarded angle fitting depression portion.

4 Claims, 10 Drawing Sheets

VALVE TIMING CONTROL DEVICE

CROSS REFERENCE TO RELATED APPLICATIONS

This application is based on and claims priority under 35 U.S.C. §119 to Japanese Patent Application 2012-176052, filed on Aug. 8, 2012, the entire content of which is incorporated herein by reference.

TECHNICAL FIELD

This disclosure relates to a valve timing control device, and particularly, to an improvement of a valve timing control device in which a drive side rotating member, which rotates in synchronization with a crankshaft of an internal combustion engine and a driven side rotating member, disposed coaxially with the drive side rotating member, which rotates integrally with a valve opening/closing camshaft, of the internal combustion engine are provided so that a relative rotation phase of the rotating members is changeable, and which includes a lock mechanism which constrains the relative rotation phase.

BACKGROUND DISCUSSION

As the valve timing control device configured in the way heretofore described, WO2011/055589 (Reference 1) is such that a plurality of fluid pressure chambers are formed on the inner periphery side of the drive side rotating member, the driven side rotating member is fitted inside thereof, and the fluid pressure chambers are partitioned by respective vanes provided protruding from the outer surface of the driven side rotating member, thereby forming advanced angle chambers and retarded angle chambers. Also, this configuration includes an intermediate lock mechanism which constrains the relative rotation phase of the drive side rotating member and driven side rotating member to an intermediate lock phase which is an intermediate phase between a most advanced angle and a most retarded angle, and a most retarded angle lock mechanism which constrains the relative rotation phase to a most retarded angle phase in which the relative rotation phase is at the most retarded angle.

In WO2011/055589 (Reference 1), the intermediate lock mechanism includes a groove-shaped intermediate lock groove formed in the outer periphery of the driven side rotating member and a pair of intermediate lock members provided so as to be advanceable into and withdrawable from the drive side rotating member, in which the relative rotation phase is constrained to the intermediate lock phase by simultaneously retaining both the intermediate lock members one in each end of the intermediate lock groove. Also, the most retarded angle lock mechanism includes, apart from the intermediate lock mechanism, a most retarded angle lock groove formed in the outer periphery of the driven side rotating member and a most retarded angle lock member provided so as to be advanceable into and withdrawable from the drive side rotating member, in which the relative rotation phase is constrained to the most retarded angle phase by the most retarded angle lock member being retained in the most retarded angle lock groove.

As the valve timing control device configured in the way heretofore described, a lock mechanism which constrains the relative rotation phase to the most retarded angle and a phase shift limiting mechanism which allows the relative rotation phase to shift within a set allowable range are described in JP 2007-198365A (Reference 2). In JP 2007-198365A (Reference 2), when the condition of an engine, such as temperature, satisfies certain conditions, the engine is started with the relative rotation phase set to the most retarded angle by the lock mechanism.

In JP 2007-198365A (Reference 2), when starting the engine, a lock member of the lock mechanism is in a lock state by being inserted in an engagement depression portion, and an advanceable/withdrawable member of the phase shift limiting mechanism is in a condition in which it is inserted in a limiting depression portion. A configuration is adopted such that after a start of cranking, hydraulic oil is supplied to advanced angle control oil passages and lock passages, thus releasing a lock of the lock mechanism, after which the relative rotation phase is shifted in an advanced angle direction to hold the advanceable/withdrawable member in abutment with an end portion of the limiting depression portion, and it is thereby possible to set the relative rotation phase to the intermediate phase.

As described in WO2011/055589 (Reference 1), in order to provide the pair of intermediate lock members, spaces in which to dispose them are necessary. This causes an adverse effect, such as a reduction in the volume of oil chambers formed in the drive side rotating member or a reduction in the number of oil chambers. Three oil chambers are shown in the drawings of WO2011/055589 (Reference 1). However, in order to obtain high relative torque, it is desired to obtain a strong shift force (high relative torque) without increasing the pressure of hydraulic oil by increasing the number of oil chambers and increasing the number of vanes.

In order to improve the startability of the internal combustion engine and reduce a toxic substance, such as hydrocarbon, contained in an exhaust gas, it is necessary to set a relative rotation phase when starting the internal combustion engine to the most retarded angle, or set the relative rotation phase to the intermediate phase, based on the temperature of combustion chambers of the internal combustion engine. Also, when considering the configuration of constraining the relative rotation phase to the intermediate phase and most retarded angle phase, it is desirable to firmly constrain the relative rotation phase to each phase. Consequently, with a configuration in which it is necessary to continue supplying hydraulic oil to the advanced angle chambers in order to maintain the relative rotation phase in the intermediate rotation phase, as with the configuration described in JP 2007-198365A (Reference 2), it may happen that the relative rotation phase varies, and improvement is demanded.

A need thus exists for a valve timing control device which is not susceptible to the drawback mentioned above.

SUMMARY

In order to solve the above-described problem, according to an aspect of this disclosure, there is provided a valve timing control device, including: a drive side rotating member which rotates in synchronization with a crankshaft of an internal combustion engine; a driven side rotating member, disposed coaxially with the drive side rotating member, which rotates integrally with a valve opening/closing camshaft of the internal combustion engine; fluid pressure chambers formed by the drive side rotating member and the driven side rotating member; partition portions each provided in one of the drive side rotating member or the driven side rotating member so as to partition each respective fluid pressure chamber into an advanced angle chamber and a retarded angle chamber; advanced angle control oil passages which supply hydraulic oil to the respective advanced angle chambers in order to shift a relative rotation phase of the drive side rotating member and driven side rotating member in an advanced angle direction;

retarded angle control oil passages which supply hydraulic oil to the respective retarded angle chambers in order to shift the relative rotation phase in a retarded angle direction; an intermediate lock mechanism which constrains the relative rotation phase to an intermediate lock phase in which the relative rotation phase is a predetermined phase between a most advanced angle at the advanced angle direction operation end and a most retarded angle at the retarded angle direction operation end; and a retarded angle lock mechanism which constrains the relative rotation phase to a retarded angle lock phase in which the relative rotation phase is a phase on a retarded angle side of the intermediate lock phase, in which the intermediate lock mechanism is configured to include a single intermediate lock member provided so as to be advanceable and withdrawable from one of the drive side rotating member or the driven side rotating member toward the other, a biasing mechanism which biases the intermediate lock member so as to cause the intermediate lock member to protrude, and an intermediate fitting depression portion formed in the other one of the drive side rotating member or the driven side rotating member so that the intermediate lock member fits therein, and the retarded angle lock mechanism is configured to include a single retarded angle lock member provided so as to be advanceable and withdrawable from one of the drive side rotating member or the driven side rotating member toward the other, a biasing mechanism which biases the retarded angle lock member so as to cause the retarded angle lock member to protrude, and a retarded angle fitting depression portion formed in the other one of the drive side rotating member or the driven side rotating member so that the retarded angle lock member fits therein.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereafter, embodiments disclosed here will be explained with reference to the attached drawings.

Basic Configuration

Figure 1:
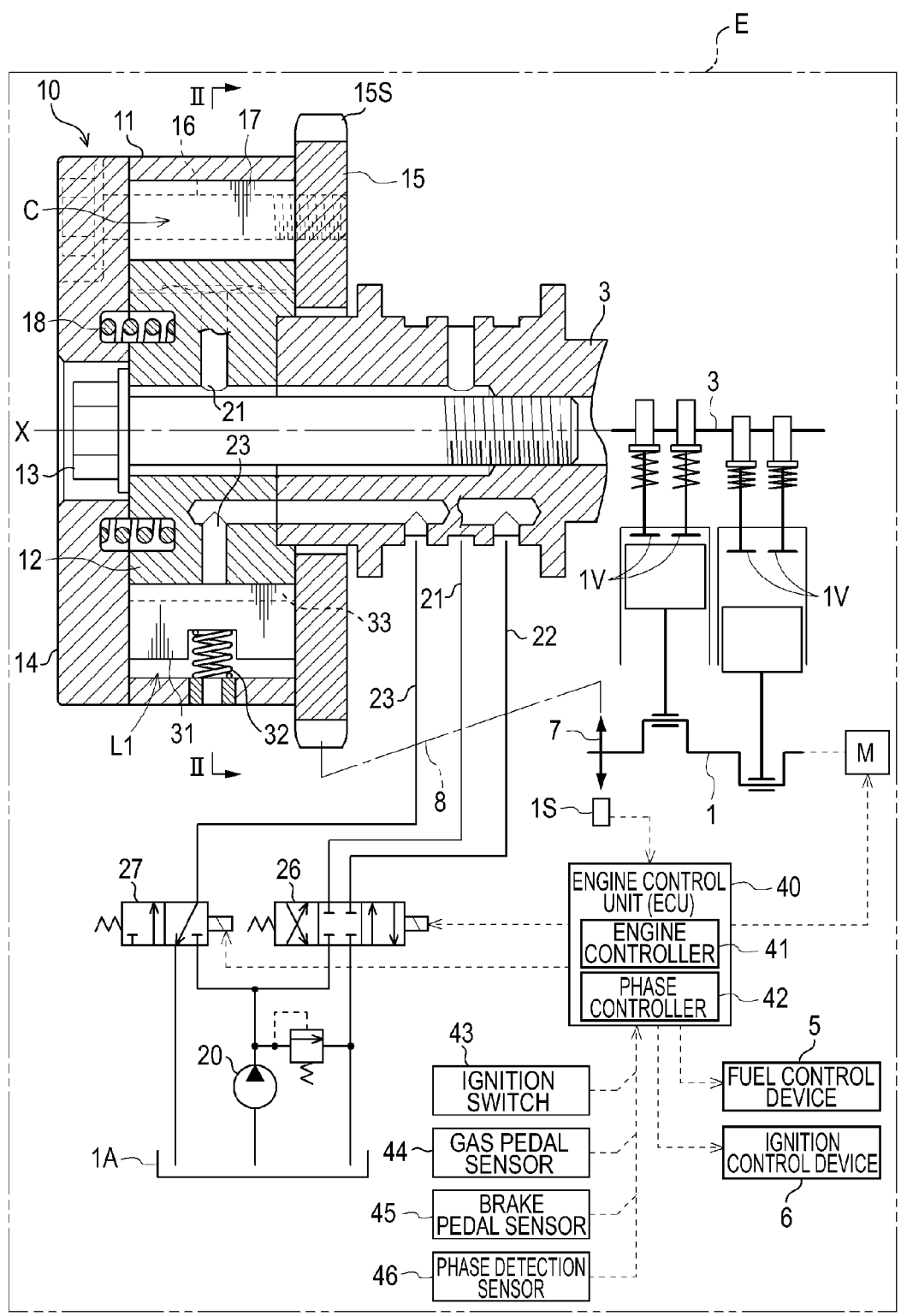
FIG. 1 is a diagram showing a configuration of an internal combustion engine control system and a longitudinal section of a valve timing control device.
Figure 2:
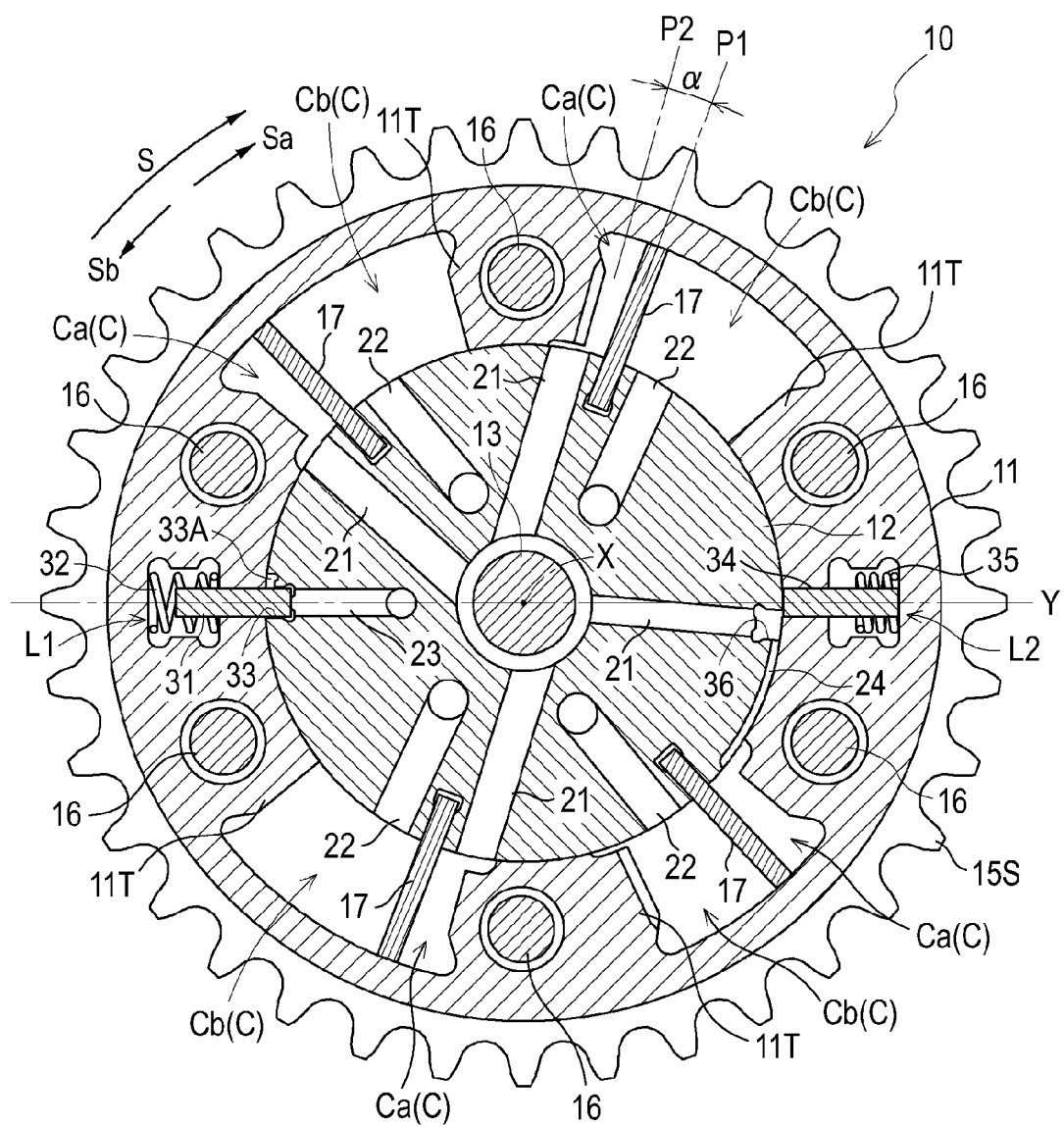
FIG. 2, being a sectional view taken along line II-II of FIG. 1, is a sectional view of the valve timing control device in an intermediate lock phase.

An internal combustion engine control system including an engine control unit (ECU) 40 which controls a valve timing control device 10, which sets a valve timing of intake valves 1V of an engine E acting as an internal combustion engine, and the engine E, is configured as shown in FIGS. 1 and 2.

The internal combustion engine control system realizes an idling stop control which automatically stops the engine E when a vehicle stops, for example, while waiting at a red light. The internal combustion engine control system may be applied to a control of the valve timing control device 10 and the engine E in a vehicle, such as a hybrid type vehicle, a stop and a start of the engine E of which is frequently carried out.

The engine E shown in FIG. 1, being provided in a vehicle, such as a passenger vehicle, includes a starter motor M which transmits drive torque to a crankshaft 1, a fuel control device 5 which controls an injection of fuel into intake ports or combustion chambers, an ignition control device 6 which controls an ignition by spark plugs (not shown), and a shaft sensor 1S which detects a rotation angle and a rotation speed of the crankshaft 1. A phase detection sensor 46 which detects a relative rotation phase of an external rotor 11 and an internal rotor 12 is provided in the valve timing control device 10.

The ECU 40 includes an engine controller 41 and a phase controller 42. The engine controller 41 carries out an automatic start and an automatic stop of the engine E. The phase controller 42 controls the relative rotation phase of the valve timing control device 10 and two kinds of lock mechanism. A control configuration and a control mode relating to the ECU 40 will be described hereafter.

Valve Timing Control Device

As shown in FIGS. 1 and 2, the valve timing control device 10 includes the external rotor 11 as a drive side rotating member which rotates in synchronization with the crankshaft 1 of the engine E, and the internal rotor 12 as a driven side rotating member connected by a connecting bolt 13 to a camshaft 3 which opens/closes the intake valves 1V in the combustion chambers of the engine E. The internal rotor 12 is fitted inside the external rotor 11 so that an axis of the external rotor 11 and an axis of the internal rotor 12 are coaxial, thus making the internal rotor 12 and the external rotor 11 relatively rotatable around an axis X. In this configuration, the axis X, as well as being a rotation axis of the camshaft 3, is a rotation axis of the external rotor 11 and the internal rotor 12.

The external rotor 11 and the internal rotor 12, being disposed coaxially with the axis X, are fastened by fastening bolts 16 with the external and internal rotors 11 and 12 sandwiched between a front plate 14 and a rear plate 15. A timing sprocket 15S is formed on the outer periphery of the rear plate 15. A central region of the internal rotor 12 is disposed passing through an opening formed in a central portion of the rear plate 15, and the intake side camshaft 3 is connected to a rear plate 15 side end portion of the internal rotor 12.

A plurality of protruding portions 11T which protrude radially inward in the direction of the axis X are formed integrally with the external rotor 11. The internal rotor 12 is formed in a cylindrical shape having an outer periphery in close contact with the protruding ends of the plurality of protruding portions 11T. By so doing, a plurality of fluid pressure chambers C are formed on the outer periphery side of the internal rotor 12, each positioned between the protruding portions 11T adjacent to each other in a rotation direction, A plurality of vanes 17 acting as partition portions, which are fitted in so as to protrude into the respective fluid pressure chambers C, are provided in the outer periphery of the internal rotor 12. An advanced angle chamber Ca and a retarded angle chamber Cb are formed in each fluid pressure chamber C by the fluid pressure chamber C being partitioned by the vane 17. The protruding end of the vane 17 comes into contact with the inner peripheral surface of each fluid pressure chamber C by the vane 17 being biased by a spring or the like in a direction away from the axis X.

As shown in FIG. 1, a torsion spring 18 which causes a biasing force to act from a condition, in which the relative rotation phase of the external rotor 11 and the internal rotor 12 (hereafter called the relative rotation phase) is at a most retarded angle, until the relative rotation phase reaches an intermediate lock phase P1 is provided across the internal rotor 12 and the front plate 14. A range on which the biasing force of the torsion spring 18 acts may be a range in which the relative rotation phase exceeds the intermediate lock phase P1, or may be a range in which the relative rotation phase does not reach the intermediate lock phase P1.

In the valve timing control device 10, a timing chain 8 is wound between an output sprocket 7 provided on the crankshaft 1 of the engine E and the timing sprocket 15S of the external rotor 11, and by so doing, the external rotor 11 rotates in synchronization with the crankshaft 1. Although not shown in the drawing, a device with a configuration the same as that of the valve timing control device 10 is also provided at the exhaust side front end of the camshaft 3, and torque is transmitted from the timing chain 8 to this device too.

The valve timing control device 10 is such that the external rotor 11 rotates in a drive rotation direction S with a drive force from the crankshaft 1, as shown in FIG. 2. Meanwhile, a direction in which the internal rotor 12 rotates in a direction the same as the drive rotation direction S relative to the external rotor 11 is called an advanced angle direction Sa, and a rotation direction opposite to the advanced angle direction Sa is called a retarded angle direction Sb. In the valve timing control device 10, the relationship between the crankshaft 1 and the camshaft 3 is set so as to increase an intake compression ratio along with an increase in phase shift amount when the relative rotation phase shifts in the advanced angle direction Sa, and reduce the intake compression ratio along with the increase in the phase shift amount when the relative rotation phase shifts in the retarded angle direction Sb.

Of the fluid pressure chambers C partitioned by the vanes 17, spaces which, by being supplied with hydraulic oil, cause the relative rotation phase to shift in the advanced angle direction Sa are the advanced angle chambers Ca, and as opposed to this, spaces which, by being supplied with hydraulic oil, cause the relative rotation phase to shift in the retarded angle direction Sb are the retarded angle chambers Cb. A relative rotation phase in which the vanes 17 have reached their advanced angle direction Sa operation ends (including a phase in the vicinity of the advanced angle direction Sa operation ends of the vanes 17) is called a most advanced angle phase, and a relative rotation phase in which the vanes 17 have reached their retarded angle direction Sb operation ends (including a phase in the vicinity of the retarded angle direction Sb operation ends of the vanes 17) is called a most retarded angle phase.

Modification Example of Valve Timing Control Device

The valve timing control device 10 has the fluid pressure chambers C formed on the inner periphery side of the external rotor 11. However, in place of this, the valve timing control device 10 may be such that the fluid pressure chambers C are formed by forming depression portions in the outer periphery of the internal rotor 12, and the vanes 17 are provided as partition members on the outer periphery of the external rotor 11 so as to partition each respective fluid pressure chamber C into the advanced angle chamber Ca and the retarded angle chamber Cb.

In the valve timing control device 10 configured as in this modification example too, the relative rotation phase shifts in the advanced angle direction Sa by supplying hydraulic oil to the advanced angle chambers Ca, and the relative rotation phase shifts in the retarded angle direction Sb by supplying hydraulic oil to the retarded angle chambers Cb.

Valve Timing Control Device: Lock Mechanisms

The valve timing control device 10 includes two lock mechanisms, an intermediate lock mechanism L1 and a most retarded angle lock mechanism L2. The intermediate lock mechanism L1 locks (constrains) the relative rotation phase of the external rotor 11 and the internal rotor 12 to the intermediate lock phase P1 shown in FIG. 2, and the most retarded angle lock mechanism L2 locks (constrains) the relative rotation phase to a most retarded angle lock phase P2, shown in FIG. 3, on the retarded angle direction Sb side of the intermediate lock phase P1. In the embodiment disclosed here, the most retarded angle lock mechanism L2, being configured as one example of a retarded lock mechanism, locks the relative rotation phase to the most retarded angle phase as one example of a retarded angle lock phase. In particular, it is sufficient that the retarded angle lock mechanism of the embodiment disclosed here has a function of locking the relative rotation phase to a phase in which the relative rotation phase is on the retarded angle side of an intermediate phase, and the retarded angle lock mechanism also includes a function of locking the relative rotation phase to a relative rotation phase in the vicinity of the most retarded angle, apart from at the most retarded angle.

The intermediate lock phase P1 is a relative rotation phase in which it is possible to suppress an HC emission when idling after starting the engine E, and is also a phase in which it is possible to easily carry out a start of the engine E with the temperature of the combustion chambers of the engine E having dropped to the ambient temperature.

Figure 3:
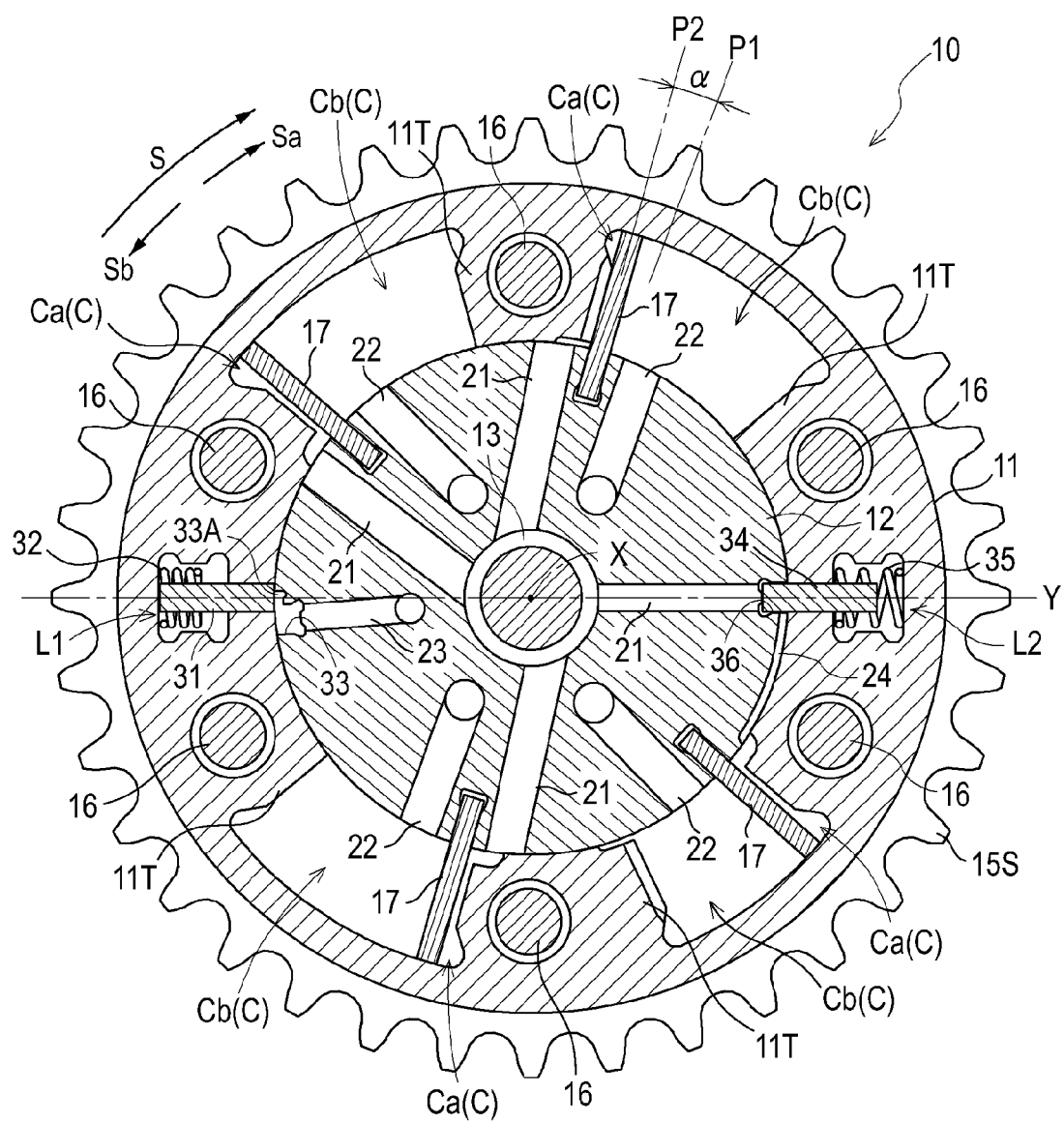
FIG. 3 is a sectional view of the valve timing control device in a most retarded angle lock phase.
Figure 4:
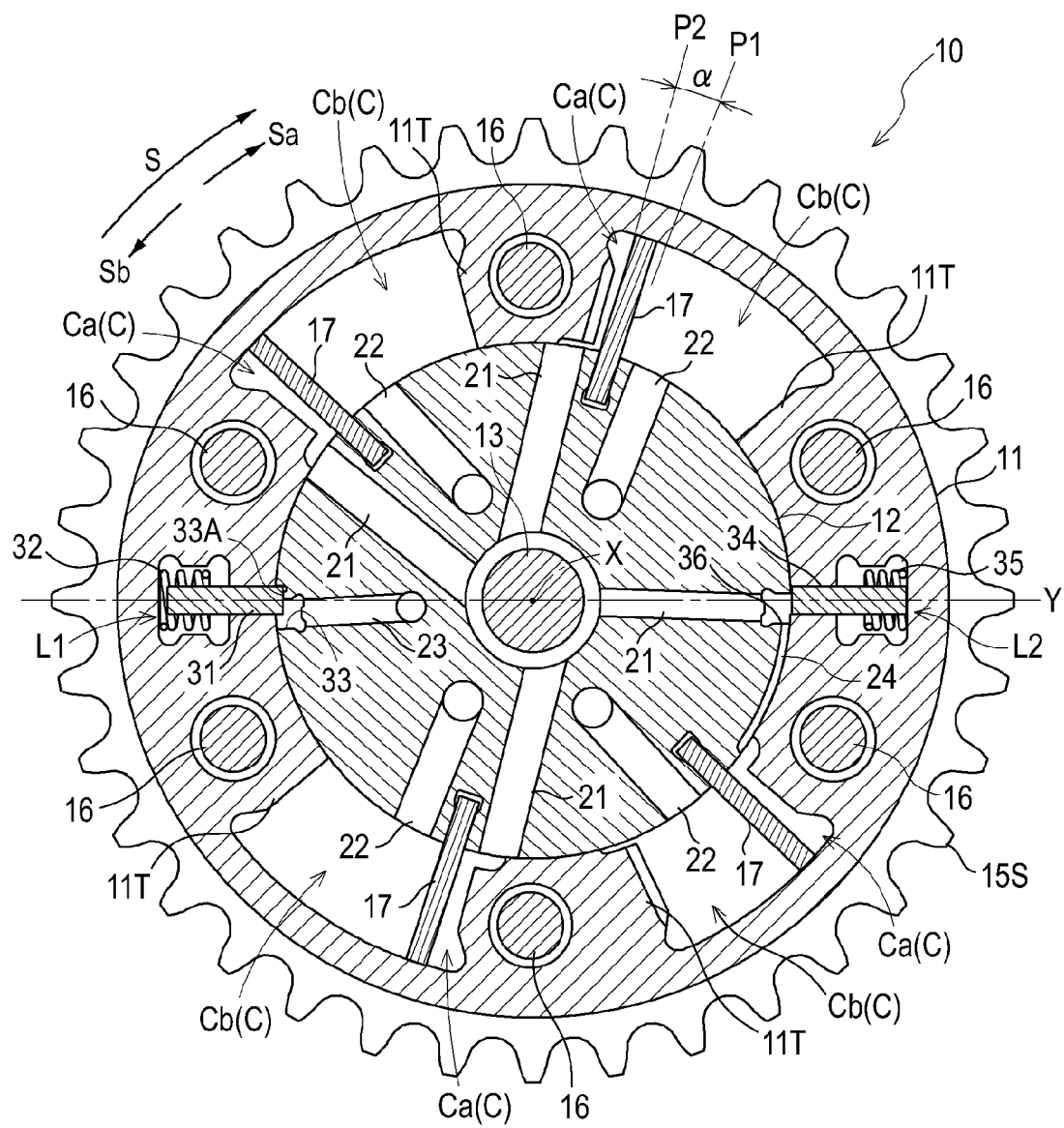
FIG. 4 is a sectional view of the valve timing control device in a phase in which an intermediate lock member engages in a stepped-in portion.

As shown in FIGS. 2 to 4, the intermediate lock mechanism L1 is configured of an intermediate lock member 31 provided so as to be advanceable into and withdrawable from the protruding portion 11T of the external rotor 11, an intermediate lock spring 32 as a biasing mechanism which biases the intermediate lock member 31 in a protruding direction, and an intermediate fitting depression portion 33 formed in the outer periphery of the internal rotor 12 so that the intermediate lock member 31 fits therein. The most retarded angle lock mechanism L2 is configured of a most retarded angle lock member 34 (one example of a retarded angle lock member) provided so as to be advanceable into and withdrawable from the protruding portion 11T of the external rotor 11, a most retarded angle lock spring 35 as a biasing mechanism which biases the most retarded angle lock member 34 in a protruding direction, and a most retarded angle fitting depression portion 36 (one example of a retarded angle fitting depression portion) formed in the outer periphery of the internal rotor 12 so that the most retarded angle lock member 34 fits therein.

Also, a ratchet stepped-in portion 33A formed into a groove shallower than the intermediate fitting depression portion 33 is formed in the intermediate fitting depression portion 33 so that the relative rotation phase continues in the retarded angle direction Sb with the intermediate lock phase P1 as a reference. By so doing, when the relative rotation phase shifts in the direction of the intermediate lock phase P1 from the most retarded angle lock phase P2, the intermediate lock member 31 engages in the stepped-in portion 33A, thereby suppressing a change of the relative rotation phase, and subsequently causing the intermediate lock member 31 to reliably make transition to a condition in which the intermediate lock member 31 fits in the intermediate fitting depression portion 33.

A position may be set so as for the stepped-in portion 33A to continue in the advanced angle direction Sa from the intermediate fitting depression portion 33, or two positions may be set so as for the stepped-in portions 33A to continue one in each of directions, the advanced angle direction Sa and the retarded angle direction Sb.

The intermediate lock member 31 and the most retarded angle lock member 34, being configured of a plate-like member, are each supported so as to be advanceable into and withdrawable from the external rotor 11 so that the protruding side end portion can move toward and away from the axis X in a position parallel to the axis X. Correspondingly, the intermediate fitting depression portion 33 and the most retarded angle fitting depression portion 36 are each formed, in a groove shape along the axial direction, in the outer periphery of the internal rotor 12. The groove width of these fitting depression portions is set to be slightly larger than the thickness of the plate-like members of the lock members. The intermediate lock member 31 and the most retarded angle lock member 34 may be configured in a pin shape or a block shape, and correspondingly, the intermediate fitting depression portion 33 and the most retarded angle fitting depression portion 36 may be formed in a pore shape or the like.

In the valve timing control device 10, a phase difference a between the intermediate lock phase P1 and the most retarded angle lock phase P2 is set to five degrees (ten degrees for the rotation angle of the crankshaft 1). In particular, the intermediate lock member 31 and the most retarded angle lock member 34 are provided one each in respective protruding portions, of the plurality of protruding portions 11T, positioned opposite each other across the axis X, and disposed on a virtual straight line Y meeting the axis X.

Valve Timing Control Device: Fluid Control Mechanism

As shown in FIGS. 2 to 4, advanced angle control oil passages 21 communicating with the respective advanced angle chambers Ca, retarded angle control oil passages 22 communicating with the respective retarded angle chambers Cb, and an intermediate lock release oil passage 23 which releases a lock (constraint) of the intermediate lock mechanism L1 are formed in the internal rotor 12. Also, in order to release a lock (constraint) of the most retarded angle lock mechanism L2, a supply oil passage 24 for supplying hydraulic oil in an adjacent advanced angle chamber Ca for use in releasing the lock is formed in the outer periphery of the internal rotor 12. Also, one of the advanced angle control oil passages 21 communicates with the most retarded angle fitting depression portion 36 in order to release the lock (constraint) of the most retarded angle lock mechanism L2 using hydraulic oil supplied from the advanced angle control oil passage 21. Further, hydraulic oil supplied to the most retarded angle fitting depression portion 36, as well as releasing the lock of the most retarded angle lock mechanism L2, is supplied to an adjacent advanced angle chamber Ca by way of the supply oil passage 24 formed in the outer periphery of the internal rotor 12.

As shown in FIG. 1, the engine E includes a hydraulic pump 20 which suctions a lubricant in an oil pan 1A by action of the drive force of the engine E and pumps it as hydraulic oil. The internal combustion control system according to the embodiment disclosed here includes a solenoid operation type phase control valve 26 which selects either the advanced angle chambers Ca or the retarded angle chambers Cb of the valve timing control device 10 and supplies the hydraulic oil from the hydraulic pump 20 to selected chambers, and a solenoid operation type release control valve 27 which supplies the hydraulic oil from the hydraulic pump 20 to the intermediate lock release oil passage 23. In particular, a fluid control mechanism of the valve timing control device 10 is configured by combining the hydraulic pump 20, the phase control valve 26, the release control valve 27, and the oil passages through which hydraulic oil is supplied and discharged.

The phase control valve 26 is configured as a solenoid valve which is operable to an advanced angle position, an intermediate position, and a neutral position with a control signal from the ECU 40. A specific mode of operation is such that when the phase control valve 26 is operated to the advanced angle position, hydraulic oil from the hydraulic pump 20 is supplied to the advanced angle chambers Ca from the advanced angle control oil passages 21, and hydraulic oil in the retarded angle chambers Cb is discharged from the retarded angle control oil passages 22. By so doing, the relative rotation phase shifts in the advanced angle direction Sa. As opposed to this, when the phase control valve 26 is operated to a retarded angle position, hydraulic oil from the hydraulic pump 20 is supplied to the retarded angle chambers Cb from the retarded angle control oil passages 22, and hydraulic oil in the advanced angle chambers Ca is discharged from the advanced angle control oil passages 21. By so doing, the relative rotation phase shifts in the retarded angle direction Sb. In the neutral position, no hydraulic oil is supplied to or discharged from either the advanced angle chambers Ca or the retarded angle chambers Cb.

The release control valve 27 is configured as a solenoid valve which is operable to a lock release position and a lock position with a control signal from the ECU 40. A specific mode of operation is such that when the release control valve 27 is operated to the lock release position, hydraulic oil from the hydraulic pump 20 is supplied to the intermediate lock release oil passage 23 to release a lock state of the intermediate lock mechanism L1. In the lock position, hydraulic oil is discharged from the intermediate lock release oil passage 23, thus maintaining the lock state.

Control Configuration and Control Mode

As shown in FIG. 1, signals from the shaft sensor 1S, an ignition switch 43, a gas pedal sensor 44, a brake pedal sensor 45, and the phase detection sensor 46 are input into the engine control unit (ECU) 40. The engine control unit 40, as well as outputting signals, one of which controls each of the starter motor M, the fuel control device 5, and the ignition control device 6, outputs signals which control the phase control valve 26 and the release control valve 27.

The ignition switch 43 is configured as a switch which starts the internal combustion engine control system, and an On operation causes the engine controller 41 to start the engine E, while an Off operation causes the engine controller 41 to stop the engine E. Also, a control state in which the idling stop control enables the engine E to stop automatically and start automatically is attained with the ignition switch 43 operated to ON.

The gas pedal sensor 44 detects the amount of depression of a gas pedal (not shown), and the brake pedal sensor 45 detects the amount of depression of a brake pedal (not shown).

The engine controller 41, as well as realizing a normal stop control which carries out a start and a stop of the engine E based on an operation of the ignition switch 43, realizes the idling stop control which temporarily stops the engine E when the vehicle stops with the engine E idled.

The phase controller 42, as well as carrying out a control of the intake valve 1V timing by the valve timing control device 10 when the engine E is in operation, carries out a control of, when the engine E is in operation, setting a relative rotation phase of the valve timing control device 10 based on a situation when the engine E is stopped, and when the engine E is stopped, making transition to a lock state achieved by the intermediate lock mechanism L1 or the most retarded angle lock mechanism L2.

When performing the normal stop control on the engine E using the ignition switch 43 in this control configuration, the relative rotation phase is shifted to the intermediate lock phase P1 by the phase controller 42 operating the phase control valve 26 with a detection signal of the phase detection sensor 46 fed back. The engine controller 41 stops the engine E after the relative rotation phase has reached the intermediate lock phase P1, as shown in FIG. 2, by performing this control. At a point at which the relative rotation phase has reached the intermediate lock phase P1 with the release control valve 27 maintained in the lock position in this control, the intermediate lock member 31 fits in the intermediate fitting depression portion 33 by action of the biasing force of the intermediate lock spring 32, and a condition in which the relative rotation phase is locked to the intermediate lock phase P1 is reached.

The intermediate lock phase P1 is a phase which causes a start of the engine E to be successfully carried out even in a situation in which the temperature of the combustion chamber of the engine E has dropped to the ambient temperature, as previously described. Consequently, when starting the engine E by operating the ignition switch 43, the engine controller 41 drives the starter motor M, thereby carrying out a cranking, and the fuel control device 5 supplies fuel to the combustion chambers, thereby carrying out a control of the ignition control device 6 igniting a mixture, thus realizing a successful start of the engine E.

Figure 5:
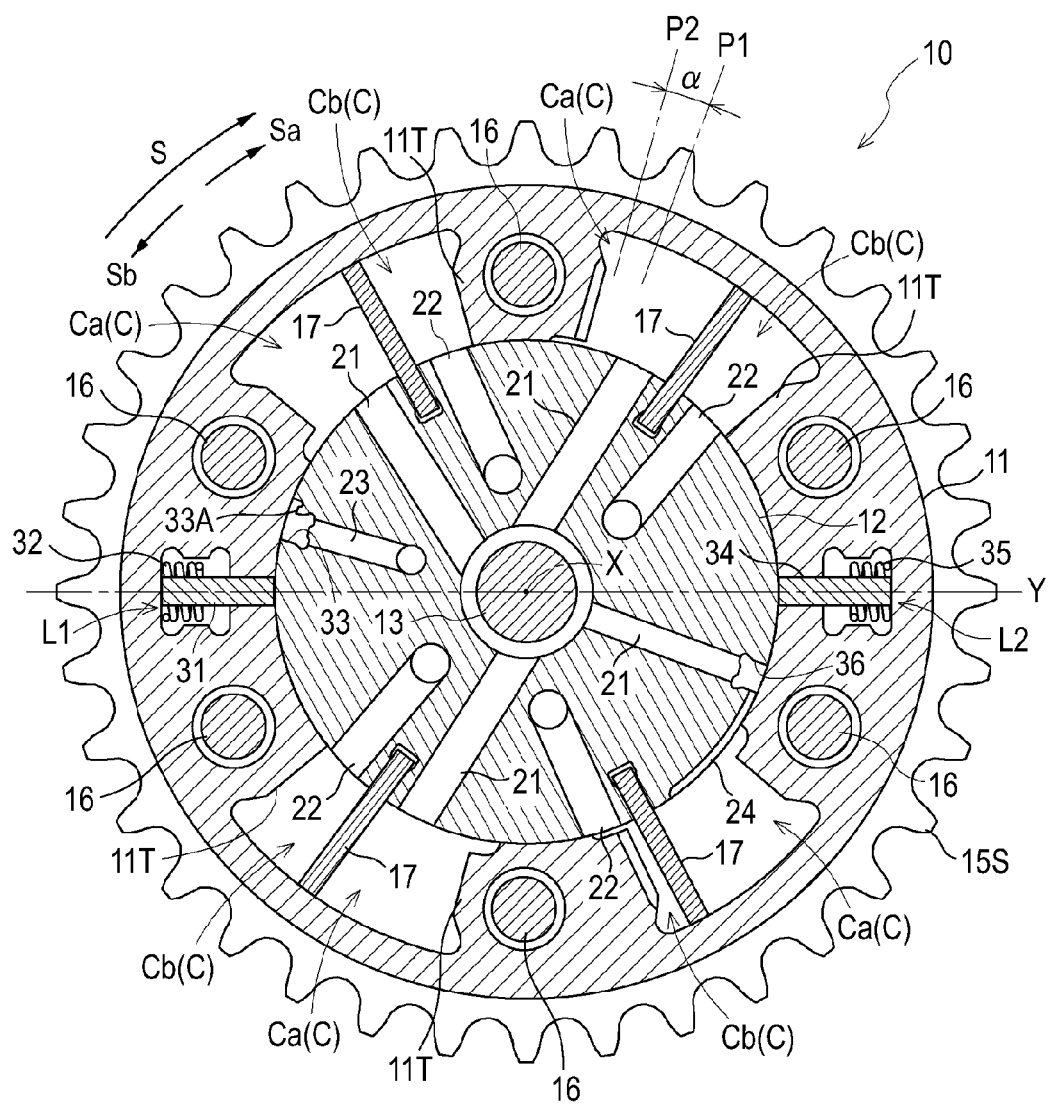
FIG. 5 is a sectional view of the valve timing control device in a phase in which a relative rotation phase is shifted to an advanced angle side of the intermediate lock phase.

After the start of the engine E, the phase controller 42 operates the phase control valve 26 and the release control valve 27, thereby releasing the lock of the intermediate lock mechanism L1, and a control of setting, for example, a phase necessary for the relative rotation phase of the external rotor 11 and the internal rotor 12, as shown in FIG. 5, is carried out in response to load torque acting on the engine E and a rotation speed of the engine E.

Also, the idling stop control is a control for improving fuel efficiency by suppressing a wasteful fuel consumption, in which the engine E is temporarily stopped when the vehicle is stopped by depressing the brake pedal during a normal driving, while the engine E is started when the depression of the brake pedal is released.

Consequently, when the brake pedal is operated to be depressed, the phase controller 42 operates the phase control valve 26 with a detection signal of the phase detection sensor 46 fed back, thereby shifting the relative rotation phase to the most retarded angle lock phase P2 shown in FIG. 3. The engine controller 41 stops the engine E after the relative rotation phase has reached the most retarded angle lock phase P2 by performing this control. The relative rotation phase is shifted in the retarded angle direction Sb by operating the phase control valve 26 to the retarded angle position with the release control valve 27 maintained in the lock position in this control. By so doing, at a point at which the relative rotation phase has reached the most retarded angle lock phase P2, the most retarded angle lock member 34 fits in the most retarded angle fitting depression portion 36 by action of the biasing force of the most retarded angle lock spring 35, and a condition in which the relative rotation phase is locked to the most retarded angle lock phase P2 is reached.

The most retarded angle lock phase P2 is such that, as the intake compression ratio is significantly reduced, as previously described, it is possible to carry out a cranking with a light load. Consequently, when the depression of the brake pedal is released with the engine E stopped by the idling stop control, the engine controller 41 drives the starter motor M, thereby starting the cranking. After the cranking has caused the rotation speed of the crankshaft 1 to reach a set value or more, the phase controller 42 operates the phase control valve 26 to the advanced angle position. By so doing, hydraulic oil is supplied to the most retarded angle fitting depression portion 36, and the most retarded angle lock member 34 is withdrawn to release the lock, after which hydraulic oil is supplied to the advanced angle chambers Ca, and the relative rotation phase is shifted in the advanced angle direction Sa.

When shifting the relative rotation phase in the advanced angle direction Sa at this time of starting the engine E, a condition in which the intermediate lock member 31 engages in the stepped-in portion 33A, as shown in FIG. 4, is reached by the relative rotation phase coming close to the intermediate lock phase P1 with the release control valve 27 maintained in the lock position. Subsequently, at a point at which the relative rotation phase has reached the intermediate lock phase P1, the intermediate lock member 31 fits in the intermediate fitting depression portion 33, and the intermediate lock mechanism L1 reaches a lock state, as shown in FIG. 2. The engine controller 41 causes the fuel control device 5 to supply fuel to the combustion chambers at the point at which the relative rotation phase has reached the intermediate lock phase P1 in this way, and an ignition by the ignition control device 6 is carried out, thereby realizing a successful start.

In particular, after the start of the engine E, the phase controller 42 operates the phase control valve 26 to supply hydraulic oil to the advanced angle chambers Ca or the retarded angle chambers Cb in response to the load, the rotation speed, and the like, of the engine E when in operation. By so doing, the relative rotation phase is shifted in the advanced angle direction Sa or the retarded angle direction Sb, and a control of shifting the relative rotation phase to the advanced angle side of the intermediate lock phase P1, as shown in FIG. 5, is also carried out.

Working Effects of Embodiment

As cam portions formed on the camshaft 3 abut against the intake valves 1V when cranking, load torque acting on the camshaft 3 varies widely. For this kind of reason, the camshaft 3 vibrates in the rotation direction when cranking, and the relative rotation phase of the external rotor 11 and the internal rotor 12 varies due to the variable torque of the camshaft 3. However, as a lock state with the relative rotation phase either locked to the intermediate lock phase P1 or locked to the most retarded angle lock phase P2 is attained when starting the engine E, it is possible to maintain a condition in which the relative rotation phase is stabilized.

As the stepped-in portion 33A is formed in a position continuing with the intermediate fitting depression portion 33, for example, when shifting the relative rotation phase from the most retarded angle lock phase P2 to the intermediate lock phase P1, after the intermediate lock member 31 has engaged in the stepped-in portion 33A, this engagement state is maintained even when the relative rotation phase of the external rotor 11 and the internal rotor 12 varies. The intermediate lock member 31 can also be displaced in the direction of the intermediate fitting depression portion 33 and fitted in the intermediate fitting depression portion 33 by the variation of the relative rotation phase.

The intermediate lock member 31 and the most retarded angle lock member 34 are provided in respective protruding portions, of the plurality of protruding portions 11T, positioned opposite each other across the axis X. This suppresses an increase in size of the protruding portions 11T, thus preventing an adverse reduction in the volume or the number of the fluid pressure chambers C, as compared with, for example, a case in which the protruding portions 11T are increased in size as when the intermediate lock member 31 and the most retarded angle lock member 34 are provided in respective predetermined protruding portions 11T. Four fluid pressure chambers C are provided in the embodiment disclosed here, but when the number of fluid pressure chambers C is, for example, three, the number of vanes 17 disposed in the fluid pressure chambers C is also three, and a total oil pressure received by the vanes 17 drops, thus making it difficult for a change of the relative rotation phase to be carried out. However, necessary fluid pressure chambers C are formed as in this configuration, thereby realizing a smooth change of the relative rotation phase without lowering relative torque effected by hydraulic oil.

Also, the intermediate lock member 31 and the most retarded angle lock member 34 are disposed on the virtual straight line Y, thereby achieving a configuration of striking a rotational balance, and it is possible to cause the valve timing control device 10 to rotate in a balanced manner.

As a configuration of locking (constraining) the relative rotation phase to the intermediate lock phase P1 and the most retarded angle lock phase P2, a configuration can also be assumed that the intermediate fitting depression portion 33 and the most retarded angle fitting depression portion 36 are formed in parallel in one protruding portion 11T, and a single lock member fitting in a selected one of these fitting depression portions. However, with the configuration that the intermediate fitting depression portion 33 and the most retarded angle fitting depression portion 36 are formed in parallel, the interval between the intermediate lock phase P1 and the most retarded angle lock phase P2 is short when the phase difference a between the intermediate lock phase P1 and the most retarded angle lock phase P2 is small, and it is also conceivable that it is not possible to obtain strength necessary for an intermediate portion between the intermediate fitting depression portion 33 and the most retarded angle fitting depression portion 36. As opposed to this kind of adverse effect, the intermediate lock member 31 is formed in one of the plurality of protruding portions 11T, while the most retarded angle lock member 34 is formed in another protruding portion 11T, as in this embodiment disclosed here, and it is thereby possible to prevent a decrease in strength.

Furthermore, by providing a single intermediate lock member 31 and a single most retarded angle lock member 34, it is easy to dispose the intermediate lock mechanism L1 and the most retarded angle lock mechanism L2 even when the phase difference a between the intermediate lock phase P1 and the most retarded angle lock phase P2 is of a small value, and it is possible to easily carry out the design of the valve timing control device 10.

Other Embodiments

This embodiment disclosed here may be configured in the following ways, apart from the heretofore described embodiment.

Figure 6:
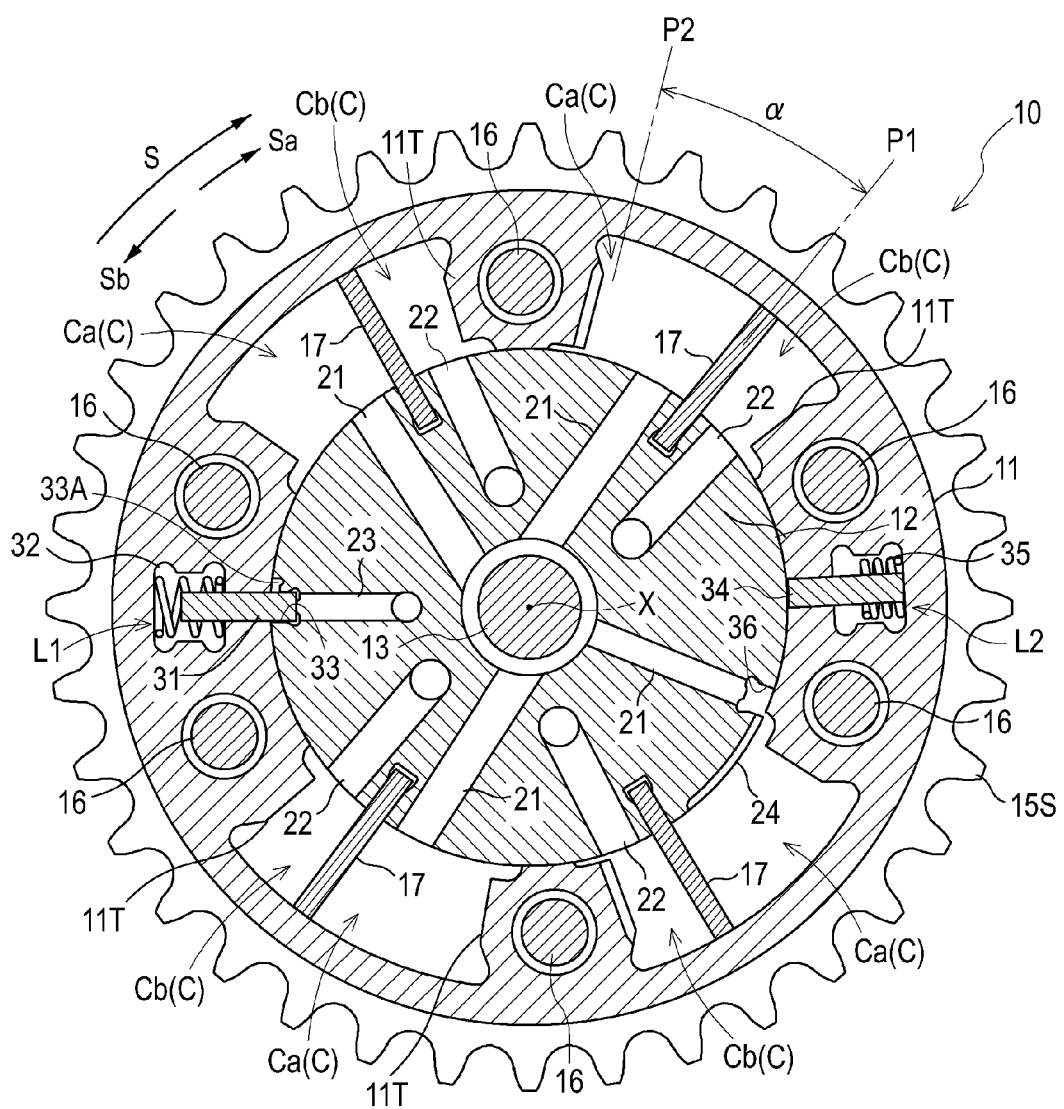
FIG. 6 is a sectional view of a valve timing control device in the intermediate lock phase in another embodiment A disclosed here.
Figure 7:
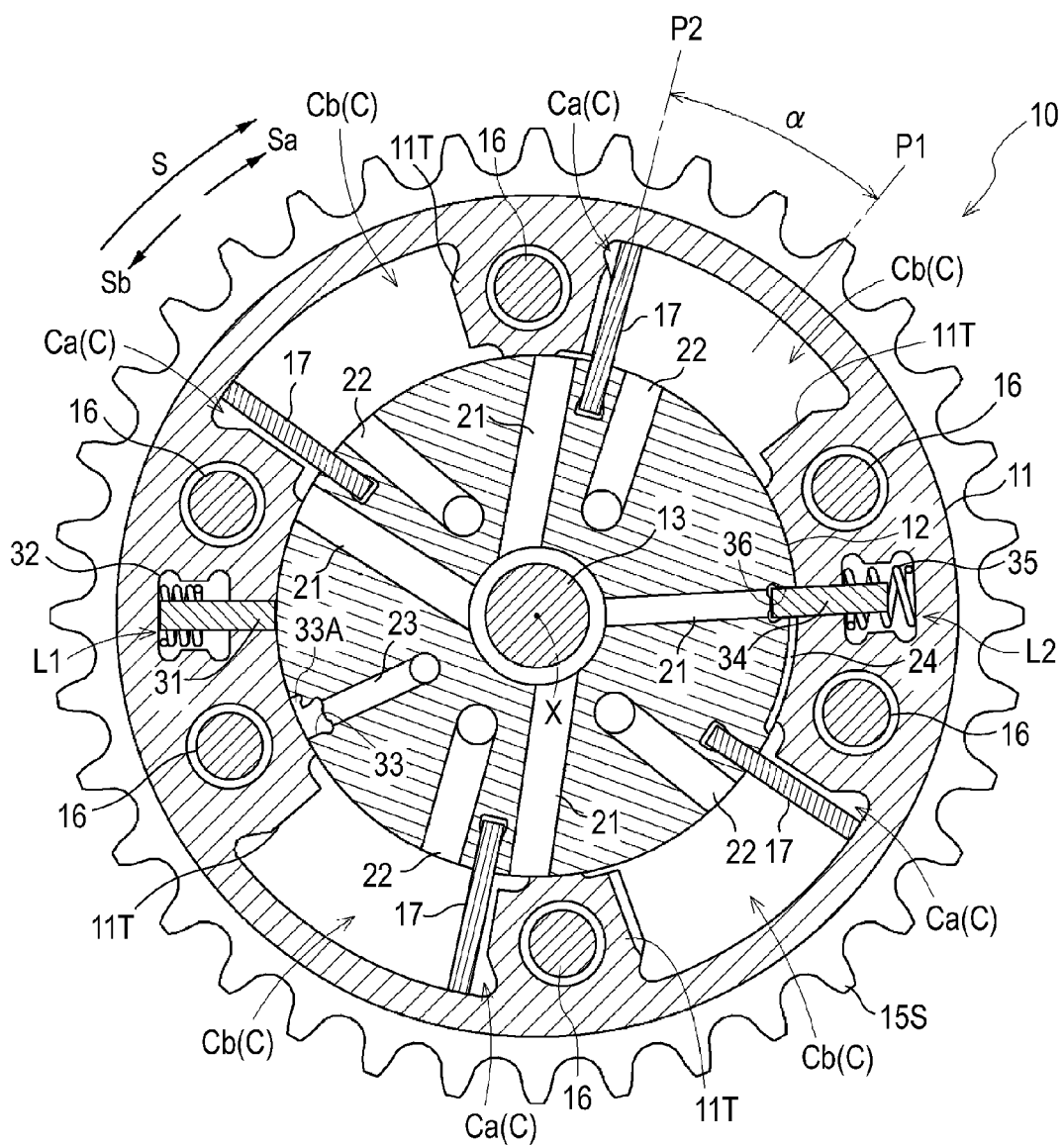
FIG. 7 is a sectional view of the valve timing control device in the most retarded angle lock phase in the other embodiment A.
Figure 8:
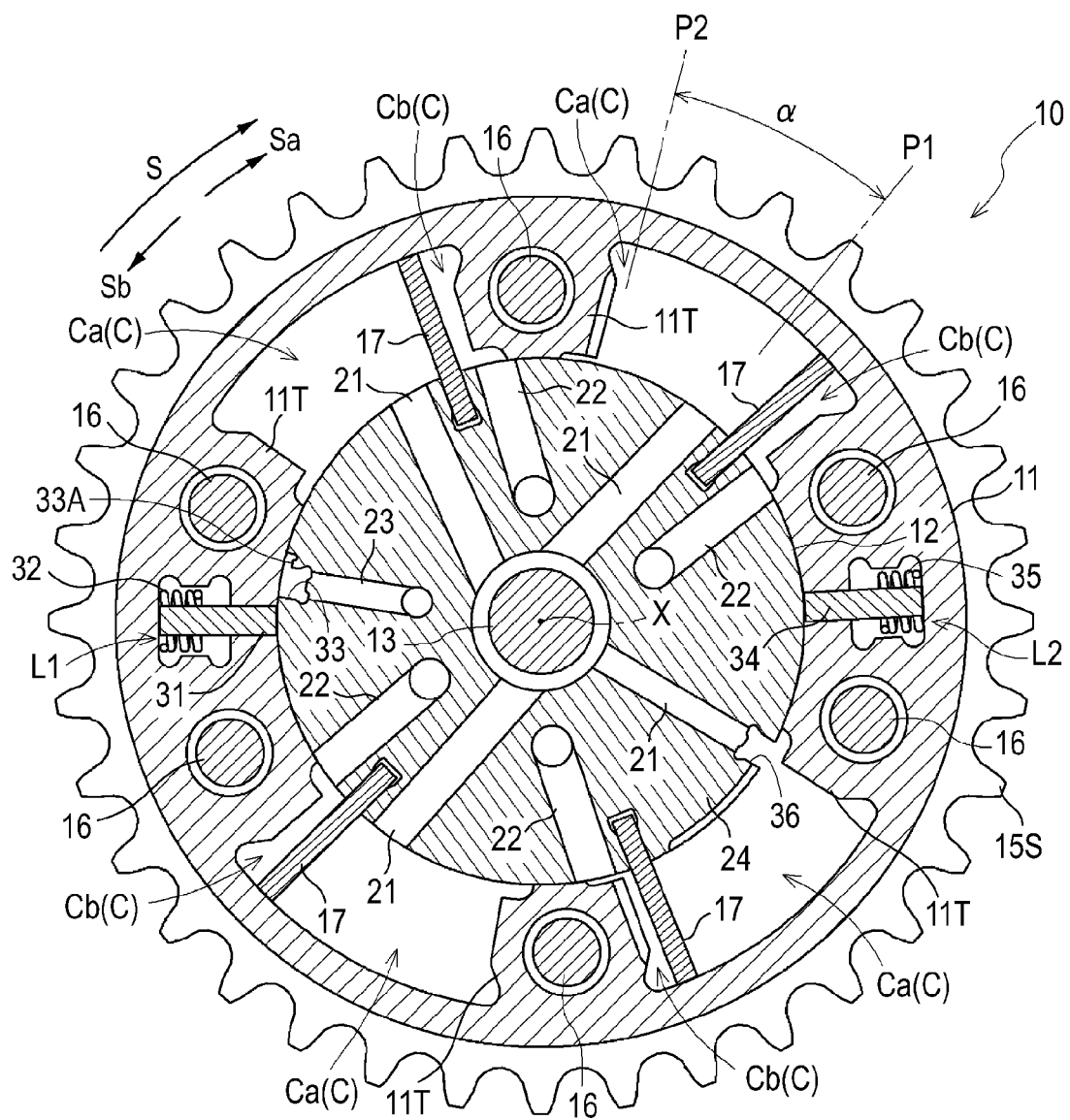
FIG. 8 is a section view of the valve timing control device in the phase on the advanced angle side of the intermediate lock phase in the other embodiment A.

A. As shown in FIGS. 6 to 8, the intermediate lock member 31 of the intermediate lock mechanism L1 and the most retarded angle lock member 34 of the most retarded angle lock mechanism L2 are provided in respective protruding portions, of the plurality of protruding portions 11T, positioned opposite each other across the axis X, in the same way as in the embodiment. In this other embodiment A, the phase difference a between the intermediate lock phase P1 and the most retarded angle lock phase P2 is set to 25 degrees (50 degrees for the rotation angle of the crankshaft 1).

This other embodiment A shows a condition in which in the valve timing control device 10, the relative rotation phase is in the intermediate lock phase P1, a condition in which the relative rotation phase is in the most retarded angle lock phase P2, and a condition in which the relative rotation phase is on the advanced angle side of the intermediate lock phase P1. The control mode when changing the relative rotation phase and the control modes when making transition to a lock and when releasing the lock are the same as those of the embodiment.

With the configuration of this other embodiment A too, it is possible to configure the valve timing control device 10 without reducing the number of fluid pressure chambers C, thus making it easy to dispose the intermediate lock mechanism L1 and the most retarded angle lock mechanism L2, and it is also possible to easily carry out the design of the valve timing control device 10.

Figure 9:
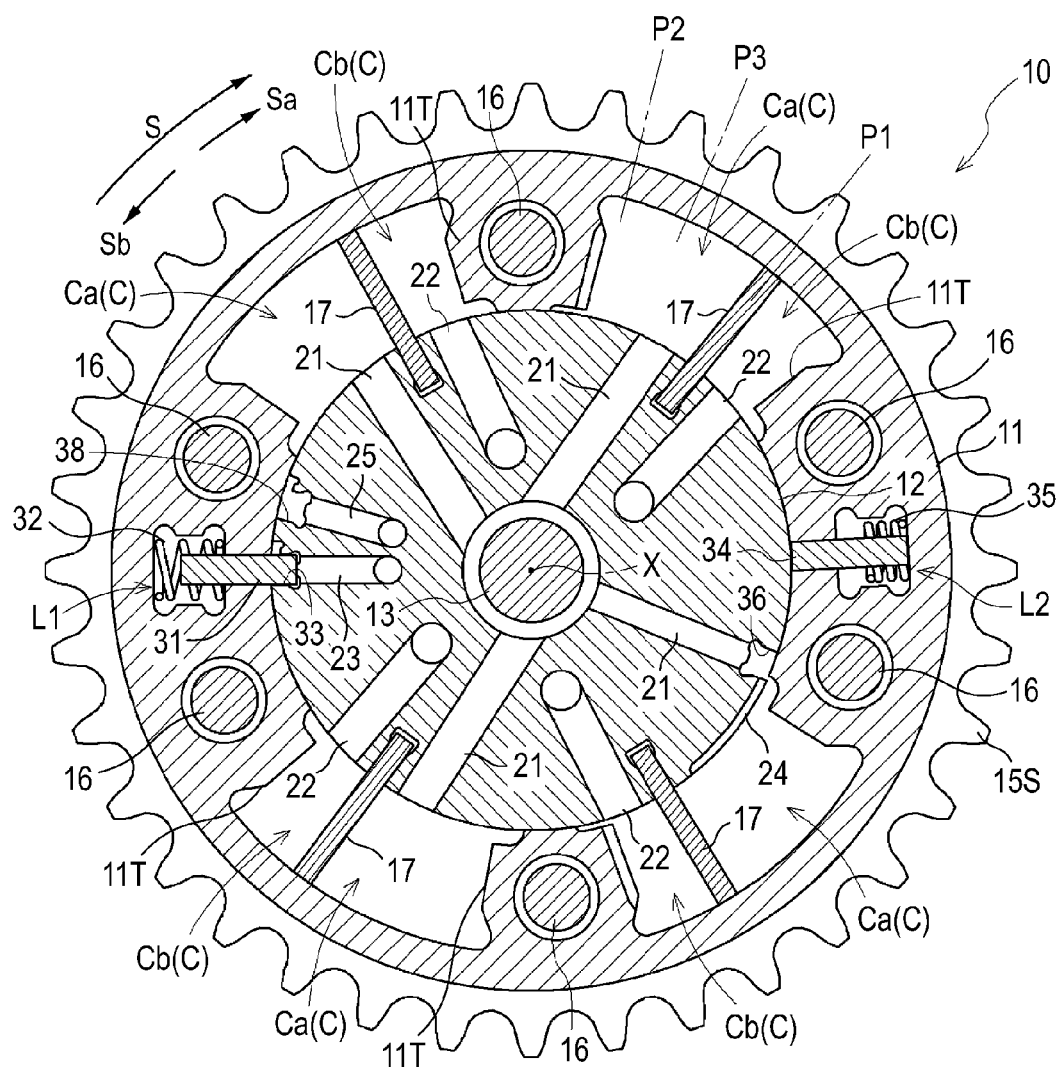
FIG. 9 is a sectional view of a valve timing control device in the intermediate lock phase in another embodiment B.
Figure 10:
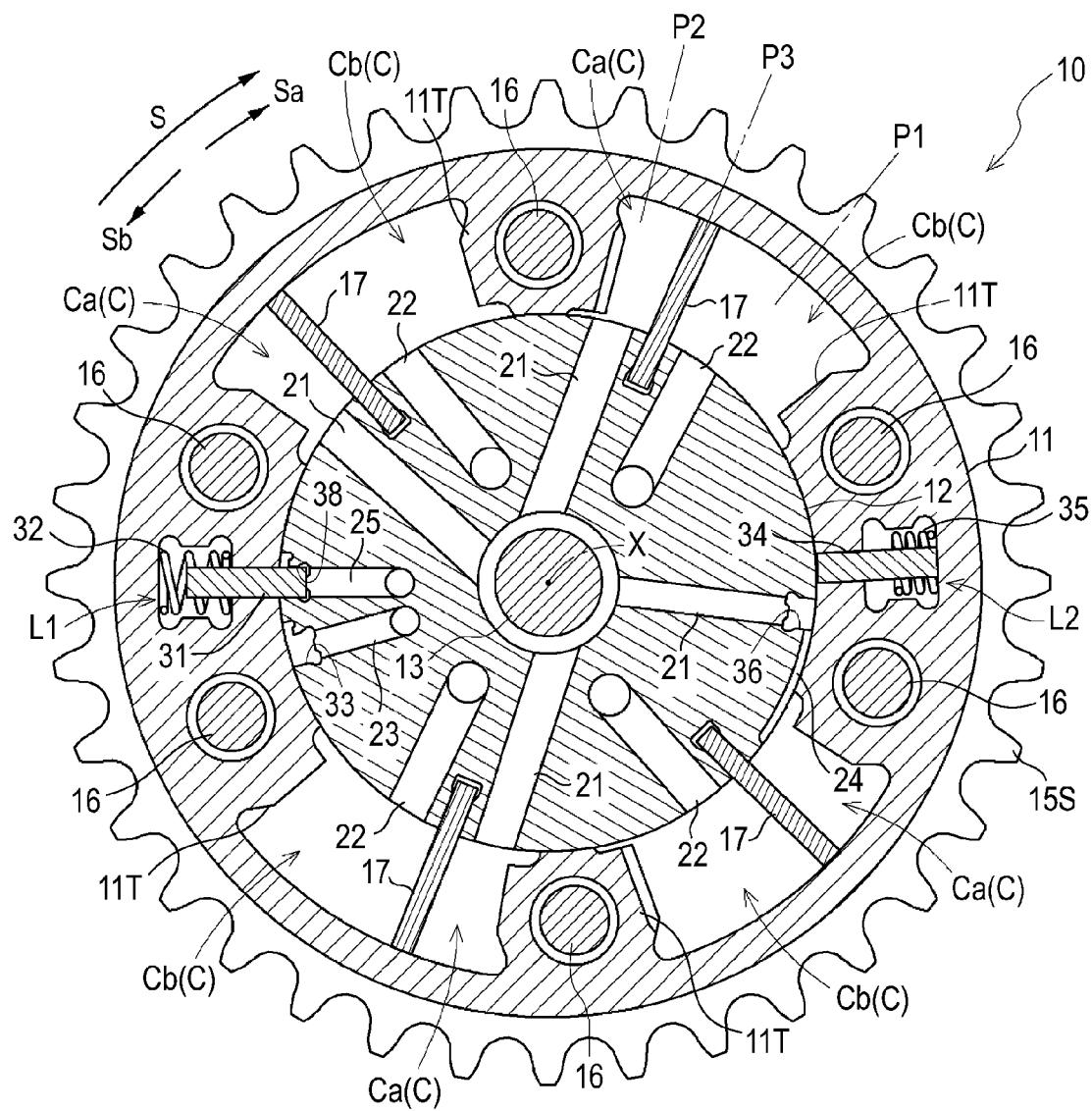
FIG. 10 is a sectional view of the valve timing control device in a phase in which the intermediate lock member fits in a secondary intermediate fitting depression portion in the other embodiment B.

B. As shown in FIGS. 9 and 10, in a predetermined phase between the most advanced angle at which the relative rotation phase is at the advanced angle direction Sa operation end and the most retarded angle at which the relative rotation phase is at the retarded angle direction Sb operation end, a secondary intermediate fitting depression portion 38, apart from the intermediate fitting depression portion 33 of the intermediate lock mechanism L1 described in the previously described other embodiment A, may be formed on the retarded angle side of the intermediate fitting depression portion 33. A relative rotation phase in which the intermediate lock member 31 fits in the secondary intermediate fitting depression portion 38 is called a secondary intermediate lock phase P3.

In this other embodiment B, it is possible to lock the relative rotation phase to the secondary intermediate lock phase P3 which is an intermediate phase between the intermediate lock phase P1 and the most retarded angle lock phase P2. Because of this, it is also possible to maintain an optimum intake timing set based on the load torque acting on the engine E, the rotation speed, and the like.

In this other embodiment B, a secondary intermediate lock release oil passage 25 which supplies hydraulic oil to the secondary intermediate fitting depression portion 38 is formed. Consequently, it is conceivable to use a three-position type of the release control valve 27, or to use a dedicated control valve, in order to supply hydraulic oil to the secondary intermediate lock release oil passage 25. Also, the secondary intermediate lock release oil passage 25 may be configured so as to communicate with the intermediate lock release oil passage 23.

As a modification example of this other embodiment B, two or more secondary intermediate fitting depression portions 38 may be formed, or apart from the intermediate lock member 31, a lock member fitting in the secondary intermediate fitting depression portion 38 may be formed in the external rotor 11.

C. In the previously described embodiment, a configuration is adopted such that hydraulic oil from the advanced angle oil passage 21 in the internal rotor 12 is supplied to the most retarded angle fitting depression portion 36, but in place of this, a configuration may be adopted such that hydraulic oil from the advanced angle oil passage 21 is supplied to the advanced angle chamber Ca adjacent to the most retarded angle fitting depression portion 36, and hydraulic oil in the advanced angle chamber Ca is supplied from the supply oil passage 24 to the most retarded angle fitting depression portion 36. By adopting this kind of configuration, it is possible to carry out a lock release by causing the most retarded angle lock member 34 to move away from the most retarded angle fitting depression portion 36 using hydraulic oil supplied to the advanced angle chamber Ca.

D. The lock mechanism may be configured of a lock member provided so as to be advanceable into and withdrawable from the internal rotor 12, and a fitting depression portion formed in the inner periphery of the external rotor 11 so that the lock member fits therein.

This embodiment disclosed here can be utilized in a valve timing control device which controls a relative rotation phase of a driven side rotating member relative to a drive side rotating member which rotates in synchronization with a crankshaft of an internal combustion engine.

Therefore, aspects of this disclosure are further described below.

According to aspects of the embodiments disclosed here, there is provided a valve timing control device including a drive side rotating member which rotates in synchronization with a crankshaft of an internal combustion engine; a driven side rotating member, disposed coaxially with the drive side rotating member, which rotates integrally with a valve opening/closing camshaft of the internal combustion engine; fluid pressure chambers formed by the drive side rotating member and the driven side rotating member; partition portions each provided in one of the drive side rotating member or the driven side rotating member so as to partition each respective fluid pressure chamber into an advanced angle chamber and a retarded angle chamber; advanced angle control oil passages which supply hydraulic oil to the respective advanced angle chambers in order to shift a relative rotation phase of the drive side rotating member and the driven side rotating member in an advanced angle direction; retarded angle control oil passages which supply hydraulic oil to the respective retarded angle chambers in order to shift the relative rotation phase in a retarded angle direction; an intermediate lock mechanism which constrains the relative rotation phase to an intermediate lock phase in which the relative rotation phase is a predetermined phase between a most advanced angle at the advanced angle direction operation end and a most retarded angle at the retarded angle direction operation end; and a retarded angle lock mechanism which constrains the relative rotation phase to a retarded angle lock phase in which the relative rotation phase is a phase on a retarded angle side of the intermediate lock phase, in which the intermediate lock mechanism is configured to include a single intermediate lock member provided so as to be advanceable and withdrawable from one of the drive side rotating member or the driven side rotating member toward the other, a biasing mechanism which biases the intermediate lock member so as to cause the intermediate lock member to protrude, and an intermediate fitting depression portion formed in the other one of the drive side rotating member or the driven side rotating member so that the intermediate lock member fits therein, and in which the retarded angle lock mechanism is configured to include a single retarded angle lock member provided so as to be advanceable and withdrawable from one of the drive side rotating member or the driven side rotating member toward the other, a biasing mechanism which biases the retarded angle lock member so as to cause the retarded angle lock member to protrude, and a retarded angle fitting depression portion formed in the other one of the drive side rotating member or the driven side rotating member so that the retarded angle lock member fits therein.

According to this configuration, when the relative rotation phase reaches the intermediate lock phase, the intermediate lock member of the intermediate lock mechanism fits in the intermediate fitting depression portion by action of the biasing force of the biasing mechanism, thereby constraining the relative rotation phase to the intermediate lock phase. Also, when the relative rotation phase reaches the retarded angle lock phase, the retarded angle lock member of the retarded angle lock mechanism fits in the retarded angle fitting depression portion by action of the biasing force of the biasing mechanism, thereby constraining the relative rotation phase to the retarded angle lock phase. In this configuration, the intermediate lock mechanism is configured including the single intermediate lock member, and the retarded angle lock mechanism is configured including the single retarded angle lock member. Because of this, it does not happen that an adverse effect, such as a reduction in the volume of oil chambers formed in the drive side rotating member, a reduction in the number of oil chambers, or the like, is caused, as compared with a configuration that a plurality of lock members are provided, for example, as in the valve timing control device described in WO2011/055589. From this kind of reason, it is possible to form a necessary number of fluid pressure chambers without reducing the volume of the fluid pressure chambers, and moreover, a strong phase shift force (high relative torque) is obtained without increasing the pressure of hydraulic oil acting on vanes.

Consequently, the valve timing control device which firmly constrains the drive side rotating member and the driven side rotating member to the intermediate phase and the rotation phase on the retarded angle side of the intermediate phase is rationally configured.

This disclosure may be such that a stepped-in portion, shallower than the intermediate fitting depression portion, provided continuing in the advanced angle direction or the retarded angle direction from the intermediate fitting depression portion of the intermediate lock mechanism, is formed.

According to this configuration, by the intermediate lock member fitting in the stepped-in portion when the relative rotation phase reaches the vicinity of the intermediate lock phase, it is possible to maintain the relative rotation phase in the vicinity of the intermediate lock phase. Subsequently, the intermediate lock member fits in the intermediate fitting depression portion at a point at which the relative rotation phase has reached the intermediate lock phase along with a change of the relative rotation phase, and it is thus possible to make transition to a condition in which the relative rotation phase is constrained to the intermediate lock phase.

This disclosure may be such that the intermediate lock member and the retarded angle lock member are disposed in respective positions opposite each other across a rotation axis of the driven side rotating member.

For example, when it is assumed that the single lock member is provided in the drive side rotating member, and that two depression portions, a depression portion corresponding to the most retarded angle phase and a depression portion corresponding to the intermediate phase, are formed in the driven side rotating member, it is conceivable that when the phase difference between the most retarded angle phase and the intermediate phase is small, the two depression portions cannot be formed, or the distance between the two depression portions is short, thus causing a decrease in strength. As opposed to this, the intermediate lock member of the intermediate lock mechanism and the retarded angle lock member of the retarded angle lock mechanism are disposed in respective positions opposite each other across the rotation axis of the driven side rotating member, thereby realizing ease of installation, and realizing a strong constraint condition in the intermediate phase and the most retarded angle phase without causing a decrease in strength.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A valve timing control device, comprising:
   a drive side rotating member which rotates in synchronization with a crankshaft of an internal combustion engine;
   a driven side rotating member, disposed coaxially with the drive side rotating member, which rotates integrally with a valve opening/closing camshaft of the internal combustion engine;
   fluid pressure chambers formed by the drive side rotating member and the driven side rotating member;
   partition portions each provided in one of the drive side rotating member or the driven side rotating member so as to partition each respective fluid pressure chamber into an advanced angle chamber and a retarded angle chamber;
   advanced angle control oil passages which supply hydraulic oil to the respective advanced angle chambers in order to shift a relative rotation phase of the drive side rotating member and the driven side rotating member in an advanced angle direction;
   retarded angle control oil passages which supply hydraulic oil to the respective retarded angle chambers in order to shift the relative rotation phase in a retarded angle direction;
   an intermediate lock mechanism which constrains the relative rotation phase to an intermediate lock phase in which the relative rotation phase is a predetermined phase between a most advanced angle at the advanced angle direction operation end and a most retarded angle at the retarded angle direction operation end; and
   a retarded angle lock mechanism which constrains the relative rotation phase to a retarded angle lock phase in which the relative rotation phase is a phase on a retarded angle side of the intermediate lock phase, wherein
   the intermediate lock mechanism is configured to include a single intermediate lock member provided so as to be advanceable and withdrawable from one of the drive side rotating member or the driven side rotating member toward the other, a biasing mechanism which biases the intermediate lock member so as to cause the intermediate lock member to protrude, and an intermediate fitting depression portion formed in the other one of the drive side rotating member or the driven side rotating member so that the intermediate lock member fits therein, and
   the retarded angle lock mechanism is configured to include a single retarded angle lock member provided so as to be advanceable and withdrawable from one of the drive side rotating member or the driven side rotating member toward the other, a biasing mechanism which biases the retarded angle lock member so as to cause the retarded angle lock member to protrude, and a retarded angle fitting depression portion formed in the other one of the drive side rotating member or the driven side rotating member so that the retarded angle lock member fits therein.

2. The valve timing control device according to claim 1, wherein
   a stepped-in portion, shallower than the intermediate fitting depression portion, provided continuing in the advanced angle direction or the retarded angle direction from the intermediate fitting depression portion of the intermediate lock mechanism, is formed.

3. The valve timing control device according to claim 2, wherein
   the intermediate lock member and the retarded angle lock member are disposed in respective positions opposite each other across a rotation axis of the driven side rotating member.

4. The valve timing control device according to claim 1, wherein
   the intermediate lock member and the retarded angle lock member are disposed in respective positions opposite each other across a rotation axis of the driven side rotating member.

* * * * *